(12) United States Patent
Yang et al.

(10) Patent No.: US 8,671,239 B2
(45) Date of Patent: Mar. 11, 2014

(54) NONVOLATILE MEMORY APPARATUS FOR PERFORMING WEAR-LEVELING AND METHOD FOR CONTROLLING THE SAME

(75) Inventors: Wun Mo Yang, Ichon-si (KR); Yi Chun Liu, Taiwan (TW)

(73) Assignee: SK Hynix Inc., Gyeonggi-do (KR)

( * ) Notice: Subject to any disclaimer, the term of this patent is extended or adjusted under 35 U.S.C. 154(b) by 445 days.

(21) Appl. No.: 12/963,379

(22) Filed: Dec. 8, 2010

(65) Prior Publication Data

US 2012/0017053 A1    Jan. 19, 2012

(30) Foreign Application Priority Data

Jul. 15, 2010 (KR) .................. 10-2010-0068395

(51) Int. Cl.
*G06F 12/00* (2006.01)
*G11C 11/34* (2006.01)

(52) U.S. Cl.
USPC ..................................... 711/103; 365/185.33

(58) Field of Classification Search
USPC ....................... 711/103, E12.001; 365/185.33
See application file for complete search history.

(56) References Cited

U.S. PATENT DOCUMENTS

| | | | |
|---|---|---|---|
| 5,479,638 A | 12/1995 | Assar et al. | |
| 5,485,595 A | 1/1996 | Assar et al. | |
| 5,835,935 A | 11/1998 | Estakhri et al. | |
| 5,907,856 A | 5/1999 | Estakhri et al. | |
| 6,594,183 B1 | 7/2003 | Lofgren et al. | |
| 7,694,066 B2 | 4/2010 | Sakui et al. | |
| 7,797,481 B2* | 9/2010 | Lee et al. | 711/103 |
| 2009/0089485 A1* | 4/2009 | Yeh | 711/103 |
| 2010/0037001 A1* | 2/2010 | Langlois et al. | 711/103 |

FOREIGN PATENT DOCUMENTS

KR    1020070099234 A    10/2007

OTHER PUBLICATIONS

Dawoon Jung et al., "A Group-Based Wear-Leveling Algorithm for Large-Capacity Flash Memory Storage Systems", Daejeon, Republic of Korea.

* cited by examiner

*Primary Examiner* — Reginald Bragdon
*Assistant Examiner* — Mehdi Namazi
(74) *Attorney, Agent, or Firm* — William Park & Associates Patent Ltd.

(57) ABSTRACT

Various embodiments of a nonvolatile memory apparatus are disclosed. In one exemplary embodiment, the nonvolatile memory apparatus may include: a host interface; a memory controller coupled to the host interface; and a memory area including a plurality of chips controlled by the memory controller. The memory controller may be configured to assign logical addresses to the plurality of chips to form a plurality of virtual logical groups, set a plurality of threshold values and a plurality of scan ranges depending on the total erase count (TEC) of each logical group, and perform wear-leveling in stages.

20 Claims, 4 Drawing Sheets

FIG.3

Group Conversion Table

| Logical Block / Logical Group | | Chip0 | Chip1 | Chip2 | Chip3 | Chip4 | Chip5 | Chip6 | Chip7 | Chip8 | Chip9 | ChipA | ChipB | TEC |
|---|---|---|---|---|---|---|---|---|---|---|---|---|---|---|
| Logical Group0 | Address | 0 | ③ 1 | 2 | 3 | 0 | 1 | ① 2 | 3 | 0 | 1 | 2 | 3 | 8 |
|  | EC | 4 | 0 | 0 | 0 | 1 | 1 | 1 | 1 | 0 | 0 | 2 | 0 |  |
| Logical Group1 | Address | 1 | 2 | 3 | 0 | 1 | 2 | 3 | 0 | 1 | 2 | 3 | 0 | 4 |
|  | EC | ② 3 | 0 | 0 | 0 | 0 | 0 | 0 | 1 | 0 | 0 | 0 | 0 |  |
| Logical Group2 | Address | 2 | 3 | 0 | 1 | 2 | 3 | 0 | 1 | 2 | 3 | 0 | 1 | 3 |
|  | EC | 1 | 0 | 0 | 2 | 0 | 0 | 1 | 1 | 3 | 0 | 0 | 0 |  |
| Logical Group3 | Address | 3 | 0 | 1 | 2 | 3 | 0 | 1 | 2 | 3 | 0 | 1 | 2 | 3 |
|  | EC | 0 | 0 | 0 | 0 | 1 | 1 | 0 | 0 | 0 | 0 | 0 | 0 |  |
| Distance |  | 4 |  |  |  |  |  |  |  |  |  |  |  |  |

| Logical Group \ Logical Block | Group Conversion Table | | | | | | | | | | | | TEC |
|---|---|---|---|---|---|---|---|---|---|---|---|---|---|
| | 0 | 1 | 2 | 3 | 4 | 5 | 6 | 7 | 8 | 9 | A | B | |
| Logical Group0 | 0 | 1 | 2 | 3 | 0 | 1 | 2 | 3 | 0 | 1 | 2 | 3 | 8 |
| Logical Group1 | 1 | 2 | 3 | 0 | 1 | 2 | 3 | 0 | 1 | 2 | 3 | 0 | 4 |
| Logical Group2 | 2 | 3 | 0 | 1 | 2 | 3 | 0 | 1 | 2 | 3 | 0 | 1 | 3 |
| Logical Group3 | 3 | 0 | 1 | 2 | 3 | 0 | 1 | 2 | 3 | 0 | 1 | 2 | 3 |
| LEC | 8 | 0 | 0 | 0 | 1 | 2 | 3 | 4 | 0 | 0 | 0 | 0 | |

NONVOLATILE MEMORY APPARATUS FOR PERFORMING WEAR-LEVELING AND METHOD FOR CONTROLLING THE SAME

CROSS-REFERENCE TO RELATED APPLICATION

The present application claims priority under 35 U.S.C. §119(a) to Korean Patent Application No. 10-2010-0068395, filed on Jul. 15, 2010, in the Korean Intellectual Property Office, which is incorporated herein by reference in its entirety as if set forth in full.

BACKGROUND

1. Technical Field

Various embodiments of the present invention relate to a nonvolatile memory apparatus and a method for controlling the same, and more particularly, to a nonvolatile memory apparatus for performing wear-leveling and a method for controlling the same.

2. Related Art

In general, a nonvolatile memory has been used as a storage memory of various portable information devices. Recently, a solid state drive (SSD) using a NAND flash memory in place of a hard disk drive (HDD) in a personal computer (PC) has been placed on the market, and is expected to rapidly make inroads into the HDD market.

Typically, when a semiconductor storage system, such as a SSD, controls a data file, actual data is written into, erased from, or updated in a page designated by a logical address that can identify the data file. More specifically, the logical address and a physical address of a data storage area are mapped through a flash translation layer (FTL). Then, when the logical address is referred to according to a command of a host, data may be written, erased, and read at a corresponding position designated by the physical address mapped with the logical address. The physical address, as used herein, may refer to positional information of a page or sub-block in a memory area.

In a case of NAND flash memory, wear-leveling is performed to uniformly maintain the lifetimes of cells.

In order to perform the wear-leveling, the erase count (EC) information of all blocks is stored in the NAND flash memory area, and loaded into a RAM buffer when the wear-leveling is required. Then, a replaceable block is searched for to change the physical position or physical address thereof.

With a recent trend toward a large capacity SSD, the number of blocks in the memory area has increased. Therefore, the memory of the RAM buffer into which the EC information of the entire blocks should be loaded is inevitably increased. Such an increase in memory of the RAM buffer, however, may be limited by the associated cost and available chip area, among other things.

SUMMARY

Accordingly, there is a need for an improved memory apparatus, and related methods, for performing wear-leveling that may obviate one or more of the above-mentioned problems or disadvantages. It should be understood, however, that some aspects of the present invention may not necessarily obviate one or more of those problems or disadvantages.

To attain the advantages and in accordance with the purpose of the invention, as embodied and broadly described herein, one aspect of the invention may provide a nonvolatile memory apparatus comprising: a host interface; a memory controller coupled to the host interface; and a memory area including a plurality of chips controlled by the memory controller. The memory controller may be configured to assign logical addresses to the plurality of chips to form a plurality of virtual logical groups, set a plurality of threshold values and a plurality of scan ranges depending on the total erase count (TEC) of each logical group, and perform wear-leveling in stages.

In another exemplary aspect of the present invention, a nonvolatile memory apparatus may include: a host interface; a memory controller coupled to the host interface; and a memory area including a plurality of chips controlled by the memory controller. The memory controller may be configured to group the plurality of chips into a plurality of virtual logical groups, and perform wear-leveling by using TEC information of each logical group and EC information of chips physically corresponding to the same channel.

Some exemplary aspects of the present invention may provide a method for controlling a nonvolatile memory apparatus. The method may include: accumulating the TEC of each virtual logical group including a plurality of chips; storing deviation information among the respective chips by using ECs of the chips; when a wear-leveling condition is met, determining whether the TEC of the logical group exceeds one of a plurality of predetermined threshold values; and differently defining the chip scan range of a target logical group on which wear-leveling is to be performed, depending on the determination result.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

BRIEF DESCRIPTION OF THE DRAWINGS

The accompanying drawings, which are incorporated in and constitute a part of this specification, illustrate various embodiments consistent with the invention and, together with the description, serve to explain the principles of the invention.

FIG. 3 is a table showing the ECs of the logical groups according to a first exemplary embodiment.

DETAILED DESCRIPTION

Figure 1:
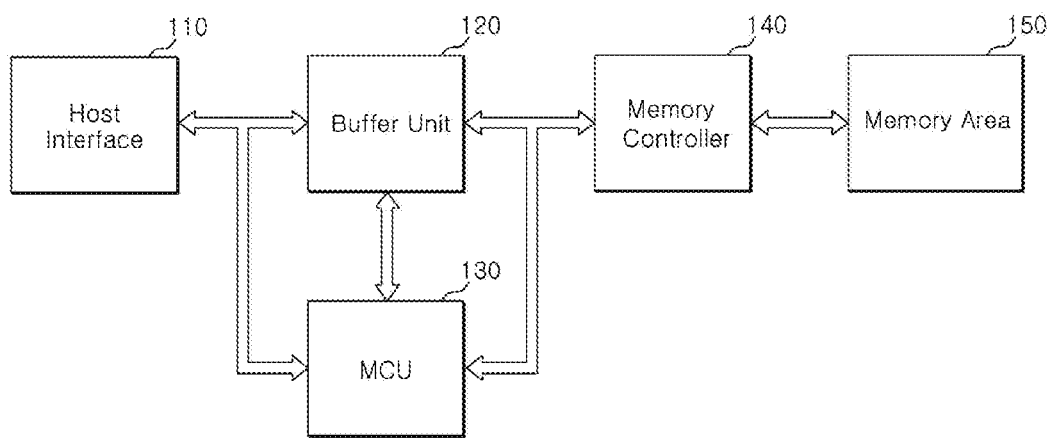
FIG. 1 is a block diagram of a nonvolatile memory apparatus according to one exemplary embodiment.

Reference will now be made in detail to the exemplary embodiments consistent with the present disclosure, examples of which are illustrated in the accompanying drawings. Wherever possible, the same reference characters will be used throughout the drawings to refer to the same or like parts.

FIG. 1 is a block diagram of a nonvolatile memory apparatus according to one exemplary embodiment. In this embodiment, the nonvolatile memory apparatus may include a memory apparatus using a NAND flash memory.

Referring to FIG. 1, the nonvolatile memory apparatus may include a host interface 110, a buffer unit 120, a micro control unit (MCU) 130, a memory controller 140, and a memory area 150.

The host interface 110 is coupled to the buffer unit 120. The host interface 110 may be configured to transmit and receive a control command, an address signal, and/or a data signal between the buffer unit 120 and an external host (not illustrated). An interfacing method between the host interface 110 and the external host may include, but be not limited to, any one of: serial advanced technology attachment (SATA), parallel advanced technology attachment (PATA), SCSI, express card, and PCI-express.

The buffer unit 120 may be configured to buffer output signals from the host interface 110 or temporarily store mapping information between logical address and physical address, block allocation information of the memory area, the EC of each block, and data received from outside. The buffer unit 120 may include a buffer that uses static random access memory (SRAM) or dynamic random access memory (DRAM).

The MCU 130 may be configured to transmit and receive a control command, an address signal, and/or a data signal to and from the host interface 110, and control the memory controller 140 according to such signals.

The memory controller 140 may be configured to receive input data and a write command from the host interface 110 and control the input data to be written into the memory area 150. Similarly, when receiving a read command from the host interface 110, the memory controller 140 reads data from the memory area 150 and controls the read data to be outputted to the outside.

In particular, the memory controller 140 according to the exemplary embodiment may make a plurality of virtual logical groups, each including a plurality of chips, and additionally manage the EC of each logical group as well as the EC of each chip. Therefore, the memory controller 140 may perform wear-leveling by the unit of the logical group (e.g., on a part of the entire chips), thereby reducing a time required for performing the wear-leveling.

More specifically, the memory controller 140 forms a plurality of virtual logical groups by treating each chip to be a logical block to which a logical address is assigned. Then, the memory controller 140 accumulates and stores the ECs of the respective logical blocks corresponding to logical addresses. When any one of the accumulated ECs exceeds a threshold value, wear-leveling is performed on a logical group of which the accumulated EC is the largest. At this time, a chip of which the EC is the largest in the logical group on which the wear-leveling is to be performed is traced to replace the chip with a chip of which the EC is the smallest in the same logical group. This operation will be described in more detail below with reference to drawings.

The memory area 150 may be configured to be controlled by the memory controller 140 and write, erase, or read data. The memory area 150 may include a NAND flash memory. In this embodiment, a cell of the NAND flash memory may include a signal level cell (SLC) or multi level cell (MLC). The memory area 150 may include a plurality of chips which are configured as a plurality of blocks including a plurality of pages.

Figure 2:
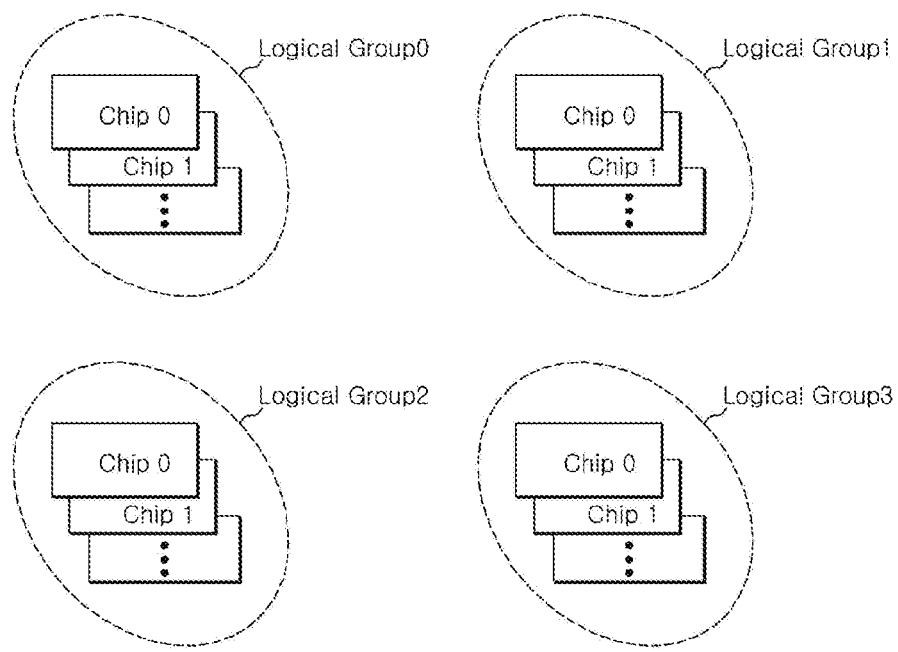
FIG. 2 is a block diagram illustrating exemplary logical groups according to one exemplary embodiment.

FIG. 2 is a block diagram illustrating exemplary logical groups according to FIG. 1, and FIG. 3 is a table illustrating the ECs of the logical groups. Referring to FIGS. 2 and 3, a wear-leveling method according to a first exemplary embodiment will be described in detail.

A first logical group (i.e., logical group0) includes a plurality of chips (chip 0, chip 1, chip 2, . . . ). A second logical group (i.e., logical group1) includes a plurality of chips (chip 0, chip 1, chip 2, . . . ).

Third and fourth logical groups (i.e., logical group2 and logical group3, respectively) illustrated in FIG. 3 may be described in the same manner as the first and second logical groups described above.

The logical addresses of the chips (chip 0, chip 1, chip 2, . . . ) in the first logical group (logical group0) are sequentially assigned as wrapping addresses from 0 to 3 corresponding to the number of entire logical groups.

Meanwhile, the logical addresses of the chips (chip 0, chip 1, chip 2, . . . ) in the second logical group (logical group1) are sequentially assigned with numbers 1, 2, 3, and 0.

Similarly, the logical addresses of the chips (chip 0, chip 1, chip 2, . . . ) in the third logical group (logical group2) are sequentially assigned with numbers 2, 3, 0, and 1, and the logical addresses of the chips (chip 0, chip 1, chip 2, . . . ) in the fourth logical group (logical group3) are sequentially assigned with numbers 3, 0, 1, and 2. That is, when mapping the addresses of each logical group (which is a virtual block), the number of entire groups is set as a modulo, and the addresses are allocated by shifting the head logical address of each logical group.

When the addresses are allocated in such a manner, the addresses of the chips in the respective groups are assigned with the addresses corresponding to the physically identical channels within a system by an interleaving scheme. For example, the logical addresses of the first chip, chip 0, in the first to fourth logical groups are assigned with 0, 1, 2, and 3, respectively, which indicates that non-overlapping addresses are assigned. Similarly, the logical addresses of the second chip, chip 1, in the first to fourth logical groups are assigned with 1, 2, 3, and 0, respectively, which indicates that non-overlapping addresses are assigned.

As such, by employing the distributed addressing scheme, it may be possible to prevent over-allocation of data area to a specific position and, thereby, enable more efficient use of the memory.

According to the first exemplary embodiment, not only the EC of each chip in each logical group is accumulated and stored, but also the ECs of all the chips in each logical group, i.e., a total erase count (TEC), is accumulated and stored.

Furthermore, a distance between the largest EC and the smallest EC for the ECs of the chips corresponding to the same channel in each logical group is calculated and stored. The term "distance," as used herein while not intended to be limited, may refer to a deviation obtained by comparing the ECs of the chips that are connected through the same channel (not illustrated) within the nonvolatile memory apparatus.

For convenience of explanation, it is assumed that the TEC of a specific logical group approaches a threshold value to meet a wear-leveling condition. For example, when the TEC of the first logical group (logical group0) approaches a predetermined threshold value of 8, the first logical group is selected as the group on which wear-leveling is to be performed (①). At this time, chips that have the largest EC distance among the chips in the first logical group are traced. This may be indirectly determined by using the distance information of the respective chips.

Referring to FIG. 3, it can be seen that chip 0 has the largest distance of 4 (②). This means that any one of chips 0 within the plurality of logical groups has a high EC. Therefore, when the wear-leveling condition is met, the logical address of chip 0 of the first logical group is substituted with that of a chip having the smallest distance within the same logical group, for example, chip 1 (③).

Meanwhile, in order to more effectively perform the wear-leveling, a variety of threshold values for the wear-leveling may be set, and a variety of wear-leveling scan ranges corresponding to the respective threshold values may be set.

Figures 4, 5:
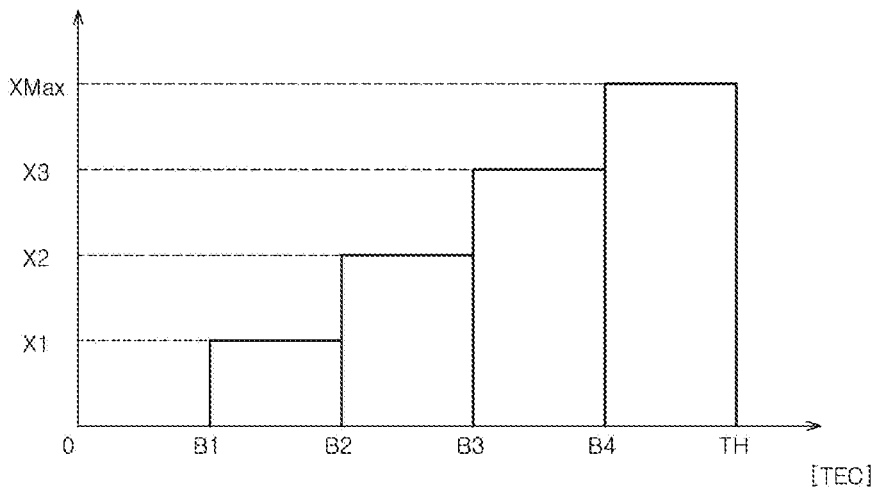
FIG. 4 is a graph showing the scan ranges of logical blocks depending on a plurality of wear-leveling threshold values.
FIG. 5 is a table showing the ECs of logical groups in a wear-leveling method according to a second exemplary embodiment.

FIG. 4 is a graph showing the scan ranges of logical blocks depending on a plurality of wear-leveling threshold values.

Referring to FIG. 4, when a wear-leveling threshold value ranges from 0 to B1, wear-leveling is not performed.

When the wear-leveling threshold value ranges from B1 to B2, only some of the chips (e.g., X1 number of chips) within a target logical group are scanned.

When the wear-leveling threshold value ranges from B2 to B3, the number of chips to be scanned within the target logical group is expanded to X2.

When the wear-leveling threshold value corresponds to TH (maximum limit), the entire chips within the target logical group (i.e., XMax) are to be scanned.

That is, a variety of wear-leveling threshold values and a variety of weights for the scan ranges may be set to efficiently control the scan time of the wear-leveling.

Referring to FIG. 4, the scan ranges depending on the threshold values may be set in various manners. For example, if a predetermined threshold value is 8, the scan range of a logical block (i.e., chips) may be set from chip 0 to chip 3, and if the predetermined threshold value is 10, the scan range is expanded to a range from chip 0 to chip 7.

Accordingly, wear-leveling does not need to be performed on the entire chips and, therefore, it is possible to reduce the chip scan time required for wear-leveling.

FIG. 5 is a table showing the ECs of logical groups in a wear-leveling method according to a second exemplary embodiment.

In order to avoid the duplicated description, only those aspects that are different from the first embodiment will be descried herein.

Referring to FIG. 5, allocating the logical addresses of 0 to 3, which correspond to the number of logical groups, to a plurality of chips (chip 0, chip 1, chip 2, . . . ) of each logical group (logical group0) is similar to the first embodiment. Also, similar to the first embodiment, a value obtained by accumulating the ECs of all the chips included in each logical group (i.e., TEC) is stored.

In the wear-leveling method according to the second exemplary embodiment, the ECs of chips corresponding to the same channel of each logical group are accumulated and stored as a logical block erase count (LEC).

As compared to the first embodiment where the EC of each chip is stored and therefore a large quantity of memory is allocated, the second embodiment does not store the EC of each chip, but instead only stores the ECs that correspond to either each group or channel. Thus, it may be possible to reduce the memory for the ECs.

The wear-leveling method according to the second embodiment may be described in more detail as follows. In this embodiment, it is assumed that the TEC of a specific logical group approaches a threshold value to meet a wear-leveling condition. For example, when the TEC of a first logical group (logical group0) reaches a threshold value of 8, the first logical group is selected as a wear-leveling target. At this time, a chip that has relatively high EC among the chips in the first logical group is traced.

By using the LEC information of each chip, the chip that has the relatively high EC can be indirectly determined. For example, referring to FIG. 5, the LEC of chip 0 in the first logical group is relatively high at 8. Therefore, when the wear-leveling condition is met, it can be recognized that chip 0 of the first logical group (logical group0) has a high EC. As described above, the scan range of logical blocks on which wear-leveling is to be performed may be defined according to the threshold value of the wear-leveling condition.

Next, a chip that has relatively low EC within the defined range is traced to perform wear-leveling by substituting the logical address of the chip whose LEC is high with that of a chip whose LEC is low. When the threshold value of the wear-leveling condition becomes higher, the number of chips to be scanned may increase.

After the address substitution has been performed by the wear-leveling, the LEC and the TEC are reset.

Figure 6:
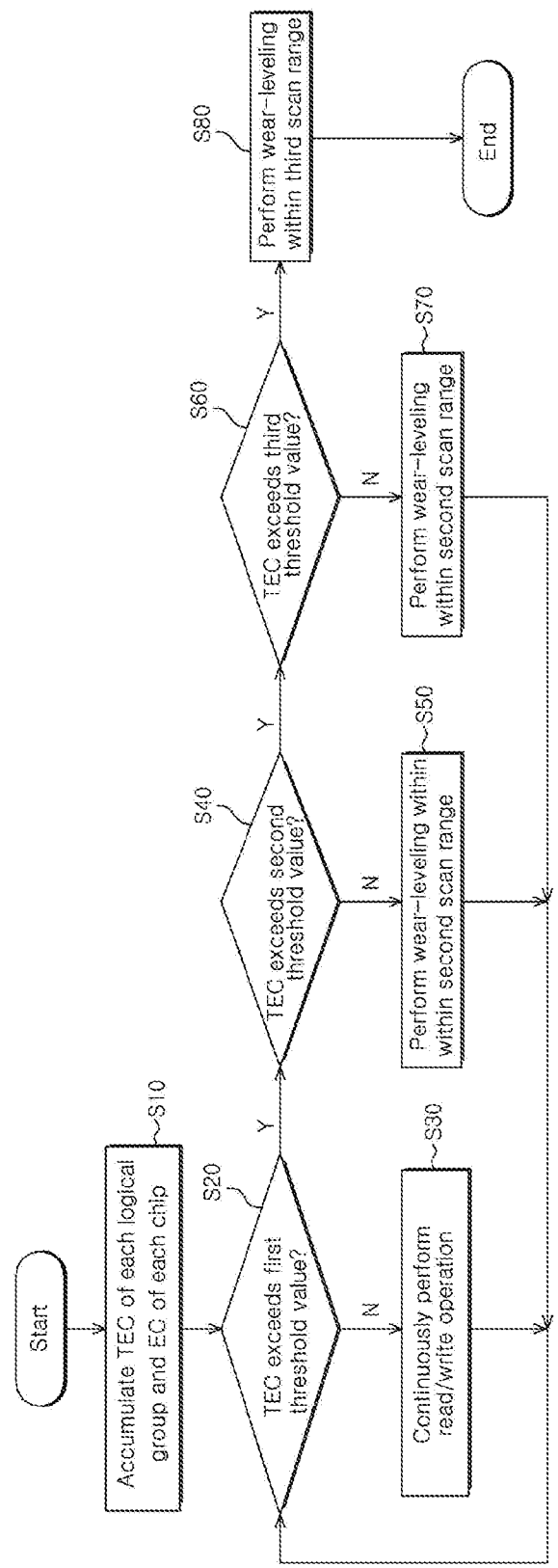
FIG. 6 is a flowchart illustrating an exemplary operation of the nonvolatile memory apparatus according to the first embodiment.

FIG. 6 is a flowchart showing an exemplary operation of the nonvolatile memory apparatus, consistent with the first embodiment of the present invention.

Referring to FIG. 6, the TEC of each logical group is accumulated, and the EC of each chip is accumulated at step S10.

For example, each chip is considered to be a logical block, and a plurality of virtual logical groups, each including a plurality of logical blocks, are set. Then, the TEC of each logical group is accumulated and stored, and simultaneously, the EC of each chip is accumulated and stored. Furthermore, a distance which is deviation information among chips corresponding to the same channel is stored by using the EC of each chip.

When the wear-leveling condition is met, it is determined whether or not the stored TEC exceeds a first threshold value at step S20.

If the stored TEC does not exceed the first threshold value (N), a read/write operation is continuously performed on each chip at step S30.

However, if the stored TEC exceeds the first threshold value (Y), it is determined whether or not the TEC exceeds a second threshold value at step S40.

If the stored TEC does not exceed the second threshold value (N), a first scan range is defined within the corresponding logical group, and wear-leveling is performed between a chip of which the EC is relatively high and a chip of which the EC is relatively low by using the distance information within the defined range, at step S50.

However, if the stored TEC exceeds the second reference value (Y), it is determined whether or not the TEC exceeds the next threshold value, that is, a third threshold value at step S60.

If the stored TEC does not exceed the third threshold value (N), a second scan range is defined within the logical group, and wear-leveling is performed between a chip of which the EC is relatively high and a chip of which the EC is relatively low by using the distance information within the defined range, at step S70.

However, if the stored TEC exceeds the third threshold value (Y), the scan range is expanded to a third scan range within the logical group, and wear-leveling is performed at step S80.

The scan ranges and the threshold values are only examples for convenience of explanation. That is, the scan ranges and the threshold values are not limited thereto, but the numbers thereof may be increased or decreased. When constant threshold values and scan ranges are divided to variably control the wear-leveling scan ranges for the threshold values, the disclosed exemplary embodiment can be implemented.

A flowchart according to the second embodiment is not shown, but the principle thereof is similar to FIG. 6. The wear-leveling method in the nonvolatile memory apparatus according to the second embodiment is different from that of the first embodiment in that the TEC of each logical group is accumulated and stored and the LEC of chips coupled through the same channel is accumulated and stored.

As described above, when the wear-leveling condition is diversified and the scan range according to the diversified wear-leveling conditions is diversified, it is possible to reduce the time required for performing wear-leveling.

While certain embodiments have been described above, it will be understood to those skilled in the art that the embodiments described are by way of example only. Accordingly, the nonvolatile memory apparatus and the method for controlling the same described herein should not be limited based on the described embodiments. Rather, the nonvolatile memory apparatus and the method for controlling the same described herein should only be limited in light of the claims that follow when taken in conjunction with the above description and accompanying drawings.

What is claimed is:

1. A nonvolatile memory apparatus comprising:
    a host interface;
    a memory controller coupled to the host interface; and
    a memory area comprising a plurality of chips controlled by the memory controller,
    wherein the memory controller is configured to assign logical addresses to the plurality of chips to form a plurality of virtual logical groups, set a plurality of threshold values and a plurality of scan ranges corresponding to the plurality of threshold values depending on a total erase count (TEC) of each logical group, and perform wear-leveling according to a scan range corresponding to a threshold value.

2. The nonvolatile memory apparatus according to claim 1, wherein the memory controller stores deviation information among erase counts (ECs) of chips that are included in different logical groups but physically correspond to the same channel.

3. The nonvolatile memory apparatus according to claim 2, wherein the memory controller is configured to set a target logical group on which wear-leveling is to be performed by using the TEC of each logical group, and trace a target chip within the target logical group by using the deviation information.

4. The nonvolatile memory apparatus according to claim 3, wherein, when the target logical group is set, the memory controller is configured to control the scan range of chips included in the corresponding logical group to vary according to a threshold value of the logical group.

5. The nonvolatile memory apparatus according to claim 4, wherein, as the threshold value of the logical group increases, the memory controller controls the scan range of the chip included in the corresponding logical group to be extended.

6. The nonvolatile memory apparatus according to claim 1, wherein the memory controller is configured to accumulate and store the TEC of chips that are included in different logical groups but physically correspond to the same channel.

7. A nonvolatile memory apparatus comprising:
    a host interface;
    a memory controller coupled to the host interface; and
    a memory area comprising a plurality of chips controlled by the memory controller,
    wherein the memory controller is configured to group the plurality of chips into a plurality of virtual logical groups, and perform wear-leveling by using total erase count (TEC) information of each logical group and erase counts (ECs) information of chips physically corresponding to the same channel.

8. The nonvolatile memory apparatus according to claim 7, wherein the memory controller is configured to store the TEC of each logical group by accumulating the ECs of chips within the logical group.

9. The nonvolatile memory apparatus according to claim 8, wherein the memory controller is configured to set a target logical group on which wear-leveling is to be performed by using the TEC of each logical group.

10. The nonvolatile memory apparatus according to claim 9, wherein, when the target logical group is set, the memory controller is configured to control the scan range of chips included in the corresponding logical group to vary according to the TEC of the logical group.

11. The nonvolatile memory apparatus according to claim 10, wherein, as the TEC of the logical group increases, the memory controller is configured to control the scan range of the chips included in the corresponding logical group to be extended.

12. The nonvolatile memory apparatus according to claim 7, wherein the memory controller is configured to store deviation information among erase counts (ECs) of chips that are included in different logical groups but physically correspond to the same channel.

13. The nonvolatile memory apparatus according to claim 12, wherein the memory controller is configured to trace a target chip within the target logical group on which wear-leveling is to be performed by using the deviation information.

14. The nonvolatile memory apparatus according to claim 7, wherein the memory controller is configured to individually accumulate the ECs of chips that are included in different logical groups but physically correspond to the same channel, and store the accumulated value for each chip.

15. The nonvolatile memory apparatus according to claim 14, wherein the memory controller is configured to trace a target chip within the target logical group on which wear-leveling is to be performed by using the accumulated value for each chip.

16. A method for controlling a nonvolatile memory apparatus, comprising:
    accumulating a total erase count (TEC) of each virtual logical group comprising a plurality of chips;
    storing deviation information among the respective chips by using erase counts (ECs) of the chips;
    when a wear-leveling condition is met, determining whether the TEC of the logical group exceeds one of a plurality of predetermined threshold values; and
    differently defining a chip scan range of a target logical group on which wear-leveling is to be performed, depending on a determination result.

17. The method according to claim 16, wherein the target logical group is set by using the TEC.

18. The method according to claim 16, wherein the ECs of the chips are used to trace a target chip within the defined chip scan range.

19. The method according to claim 18, wherein, when the target chip is traced, wear-leveling is performed by substituting the logical address of the target chip with that of a chip having the smallest EC within the defined chip scan range.

20. The method according to claim 16, wherein the step of determining whether the TEC of the logical group exceeds one of a plurality of predetermined threshold values further comprises determining, sequentially one after another, whether the TEC of the logical group exceeds any of the plurality of predetermined threshold values.

* * * * *